(12) United States Patent
Thomas et al.

(10) Patent No.: US 11,004,096 B2
(45) Date of Patent: May 11, 2021

(54) BUY INTENT ESTIMATION AND ITS APPLICATIONS FOR SOCIAL MEDIA DATA

(71) Applicant: Sprinklr, Inc., New York, NY (US)

(72) Inventors: Ragy Thomas, New York, NY (US); Murali Swaminathan, New York, NY (US); Xin Feng, New York, NY (US)

(73) Assignee: Sprinklr, Inc., New York, NY (US)

( * ) Notice: Subject to any disclaimer, the term of this patent is extended or adjusted under 35 U.S.C. 154(b) by 423 days.

(21) Appl. No.: 14/952,490

(22) Filed: Nov. 25, 2015

(65) Prior Publication Data

US 2017/0148038 A1  May 25, 2017

(51) Int. Cl.
*G06Q 30/02* (2012.01)
*G06Q 50/00* (2012.01)

(52) U.S. Cl.
CPC ..... *G06Q 30/0202* (2013.01); *G06Q 30/0242* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 6,094,829 A | 4/2000 | Li | |
| 6,601,234 B1 | 7/2003 | Bowman-Amuah | |
| 7,308,418 B2 | 12/2007 | Malek et al. | |
| 7,761,848 B1 | 7/2010 | Chaffin | |
| 7,930,302 B2 | 4/2011 | Bandaru et al. | |
| 8,225,271 B2 | 7/2012 | Eldridge et al. | |
| 8,266,148 B2 | 9/2012 | Guha et al. | |
| 8,584,082 B2 | 11/2013 | Baird et al. | |
| 8,635,281 B2 | 1/2014 | Kelly | |
| 8,645,912 B2 | 2/2014 | Welchman et al. | |
| 8,683,433 B2 | 3/2014 | Nayak et al. | |
| 8,688,726 B2 | 4/2014 | Mahajan et al. | |
| 8,694,520 B1 | 4/2014 | Krishnakumar et al. | |
| 8,707,259 B2 | 4/2014 | Trofin et al. | |
| 8,732,669 B2 | 5/2014 | Valdiviezo et al. | |
| 8,819,659 B2 | 8/2014 | Ramer et al. | |

(Continued)

FOREIGN PATENT DOCUMENTS

| | | |
|---|---|---|
| EP | 2698955 A1 | 2/2014 |
| WO | 2010008685 | 1/2010 |

(Continued)

OTHER PUBLICATIONS

S. Buckley et al., "Social media and customer behavior analytics for personalized customer engagements," in IBM Journal of Research and Development, vol. 58, No. 5/6, pp. 7:1-7:12, Sep.-Nov. 2014, doi: 10.1147/JRD.2014.2344515. (Year: 2014).*

(Continued)

*Primary Examiner* — Mehmet Yesildag
(74) *Attorney, Agent, or Firm* — Jennifer Hayes; Nixon Peabody LLP

(57) ABSTRACT

A system and method that enables usage of data embedded inside social media data to help estimate buy intent (BI), to allow companies or organizations to utilize this information to track conversations about their brand, to engage with their customers/users, to conduct advisement and investment efficiency analysis, to manage and reduce potential risk, and identify the factors that may affect company sales and revenues.

22 Claims, 3 Drawing Sheets

(56) References Cited

U.S. PATENT DOCUMENTS

| | | |
|---|---|---|
| 8,832,644 B2 | 9/2014 | Hirsch |
| 8,924,914 B2 | 12/2014 | Boeckenhauer et al. |
| 8,978,006 B2 | 3/2015 | Hirsch |
| 8,996,371 B2 | 3/2015 | Hurvitz et al. |
| 9,002,892 B2 | 4/2015 | Benyamin et al. |
| 9,116,983 B2 | 8/2015 | Ameri-Yahia et al. |
| 9,223,831 B2 | 12/2015 | Baker et al. |
| 9,448,776 B1 | 9/2016 | Sankaran |
| 9,672,032 B2 | 6/2017 | Zhou |
| 9,696,967 B2 | 7/2017 | Balasubramanian |
| 10,073,794 B2 | 9/2018 | Thomas et al. |
| 10,095,686 B2 | 10/2018 | Zhang |
| 2001/0027472 A1 | 10/2001 | Feng |
| 2006/0053156 A1 | 3/2006 | Kaushansky et al. |
| 2007/0050446 A1 | 3/2007 | Moore |
| 2007/0174255 A1 | 7/2007 | Sravanapudi |
| 2008/0249764 A1 | 10/2008 | Huang et al. |
| 2009/0319342 A1 | 12/2009 | Shilman et al. |
| 2010/0114654 A1 | 5/2010 | Lukose et al. |
| 2010/0131563 A1 | 5/2010 | Yin |
| 2010/0169304 A1 | 7/2010 | Hendrickson et al. |
| 2010/0235313 A1 | 9/2010 | Rea et al. |
| 2011/0113447 A1 | 5/2011 | Jung |
| 2011/0191372 A1 | 8/2011 | Kaushansky et al. |
| 2011/0213655 A1 | 9/2011 | Henkin |
| 2012/0036007 A1 | 2/2012 | Robertson et al. |
| 2012/0116868 A1 | 5/2012 | Chin et al. |
| 2012/0158489 A1 | 6/2012 | Benyamin et al. |
| 2012/0203584 A1 | 8/2012 | Mishor |
| 2012/0215625 A1 | 8/2012 | Ramer et al. |
| 2012/0246033 A1 | 9/2012 | Keiser |
| 2012/0246054 A1 | 9/2012 | Sastri et al. |
| 2012/0290340 A1 | 11/2012 | Ramanujam et al. |
| 2012/0290938 A1 | 11/2012 | Subbarao et al. |
| 2012/0296845 A1 | 11/2012 | Andrews et al. |
| 2013/0080264 A1 | 3/2013 | Umeda |
| 2013/0103385 A1 | 4/2013 | Ghosh et al. |
| 2013/0124653 A1 | 5/2013 | Vick |
| 2013/0132851 A1 | 5/2013 | Konopniki et al. |
| 2013/0166379 A1 | 6/2013 | Ehindero et al. |
| 2013/0238356 A1 | 9/2013 | Torrii |
| 2013/0246430 A1 | 9/2013 | Szucs et al. |
| 2013/0263019 A1 | 10/2013 | Castellanos et al. |
| 2013/0311323 A1 | 11/2013 | Stoll et al. |
| 2013/0339126 A1 | 12/2013 | Cui et al. |
| 2014/0025749 A1 | 1/2014 | Glowacki |
| 2014/0025758 A1 | 1/2014 | Glowacki |
| 2014/0056526 A1 | 2/2014 | Scipioni |
| 2014/0136323 A1 | 5/2014 | Zhang et al. |
| 2014/0188897 A1 | 7/2014 | Baker et al. |
| 2014/0254454 A1 | 9/2014 | Calcev |
| 2014/0337320 A1 | 11/2014 | Hernandez et al. |
| 2015/0106304 A1* | 4/2015 | Gupta .................... G06N 5/04 |
| | | 706/11 |
| 2015/0112753 A1 | 4/2015 | Suvarna |
| 2015/0186790 A1* | 7/2015 | Ehlen ................. G06F 17/3053 |
| | | 706/52 |
| 2016/0087933 A1 | 3/2016 | Johnson |
| 2017/0109141 A1 | 4/2017 | Thomas et al. |
| 2017/0243125 A1 | 8/2017 | Thomas et al. |
| 2017/0300564 A1 | 10/2017 | Feng et al. |
| 2017/0315996 A1 | 11/2017 | Fothergill |
| 2018/0165706 A1 | 6/2018 | Feng et al. |

FOREIGN PATENT DOCUMENTS

| | | |
|---|---|---|
| WO | 2013101812 | 7/2013 |
| WO | 2013158790 | 10/2013 |
| WO | 2013158840 | 10/2013 |
| WO | 2013/177230 A1 | 11/2013 |
| WO | 2014/143018 A1 | 9/2014 |

OTHER PUBLICATIONS

Christl et al., Using Mobile Technology for Inter-Organisational Collaboration and End-Customer Integration, ACM, 2013, pp. 1-8.

Rosa et al., Smart Composition of Reusable Software Components in Mobile Application Product Lines, ACM, 2011, pp. 45-49.

Sung et al., Mobile Application Development Classes for the Mobile Era, ACM, 2014, pp. 141-146.

Bharat et al., Building Distributed, Multi-User Applications by Direct Manipulation, ACM, 1994, pp. 71-81.

Koziokas et al., Usability Testing of Mobile Applications: Web vs. Hybrid Apps, ACM, 2017, pp. 1-2.

Meskens et al., Plug-and-Design: Embracing Mobile Devices as Part of the Design Environment, ACM, 2009, pp. 149-153.

Yang et al., Personalized Mobile Application Discovery, ACM, 2014, pp. 49-54.

Zhan et al., MCKit: A Mobile App for Conferences, ACM, 2014, pp. 59-64.

Kirk, M., Thoughtful Machine Learning: A Test-Driven Approach, O'Reilly Media, Inc., Ch. 4, Naïve Bayesian Classification, 2014.

* cited by examiner

BUY INTENT ESTIMATION AND ITS APPLICATIONS FOR SOCIAL MEDIA DATA

FIELD OF THE INVENTION

The subject matter of the present invention relates to systems and methods for making statistical inferences based upon large quantities of largely unstructured data.

BACKGROUND OF THE INVENTION

In social media, each day, billions of messages including texts, pictures, videos, blogs, surveys, discussions and feedbacks etc. are published on a variety of networks. A tremendous quantity of information is embedded inside social media data.

It can be understood that companies and other organizations might benefit from utilizing social media data to discover information in conversations about their brand, to engage with their customers, to conduct advisement and investment efficiency analysis, to manage and reduce potential risk and identify the factors that affect company sale and revenues. Thus, it can be understood that it would be beneficial to have systems for estimating and inferring end user buy intent from massive social media data.

SUMMARY OF THE INVENTION

The present invention relates to systems and methods for making inferences based upon social media data. More particularly, the present invention relates to systems and methods that enable usage of data embedded inside social media data to help estimate buy intent (BI), to allow companies and/or organizations to utilize this information to track conversations about their brand, to engage with their customers/users, to conduct advisement and investment efficiency analysis, to manage and reduce potential risk, and identify the factors that may affect company sales and revenues.

BRIEF DESCRIPTION OF THE DRAWINGS

The accompanying drawings illustrate one or more exemplary embodiments and, together with the detailed description, serve to explain the principles and exemplary implementations of the present inventions. One of skill in the art will understand that the drawings are provided for purposes of example only.

In the Drawings.

DETAILED DESCRIPTION

Various exemplary embodiments of the present inventions are described herein in the context of systems and methods for making statistical inferences based upon large quantities of largely unstructured data.

Those of ordinary skill in the art will understand that the following detailed description is illustrative only and is not intended to be limiting. Other embodiments will readily suggest themselves to such skilled persons having the benefit of this disclosure, in light of what is known in the relevant arts.

In the interest of clarity, not all of the routine features of the exemplary implementations are shown and described. It will be appreciated that in the development of any such actual implementation, numerous implementation-specific decisions must be made in order to achieve the specific goals of the developer.

Throughout the present disclosure, relevant terms are to be understood consistently with their typical meanings established in the relevant art.

Generally speaking, a system and methods are herein disclosed that enable usage of data embedded inside social media data, to allow companies or organizations to utilize this information to track conversations about their brand, to engage with their customers/users, to conduct advisement and investment efficiency analysis, to manage and reduce potential risk, and identify the factors that affect company sales and revenues. The following describes ways of using and analyzing collected social media data to determine the "buy intent" of an individual.

As will be described in further detail below, Buy intent (BI) may be defined as a real number ranging from 0.0 to 1.0 representing how likely one social media user will purchase or already bought any item from given set of products from a brand. BI is estimated based on a collection of relevance social media messages from a single user over a given period time.

As used herein, the acronym POS refers to part-of-speech tagging also called grammatical tagging or word-category disambiguation. It is the process of marking up a word in a text (corpus) as corresponding to a particular part of speech, based on both its definition, as well as its context—i.e. relationship with adjacent and related words in a phrase, sentence, or paragraph.

Figure 1:
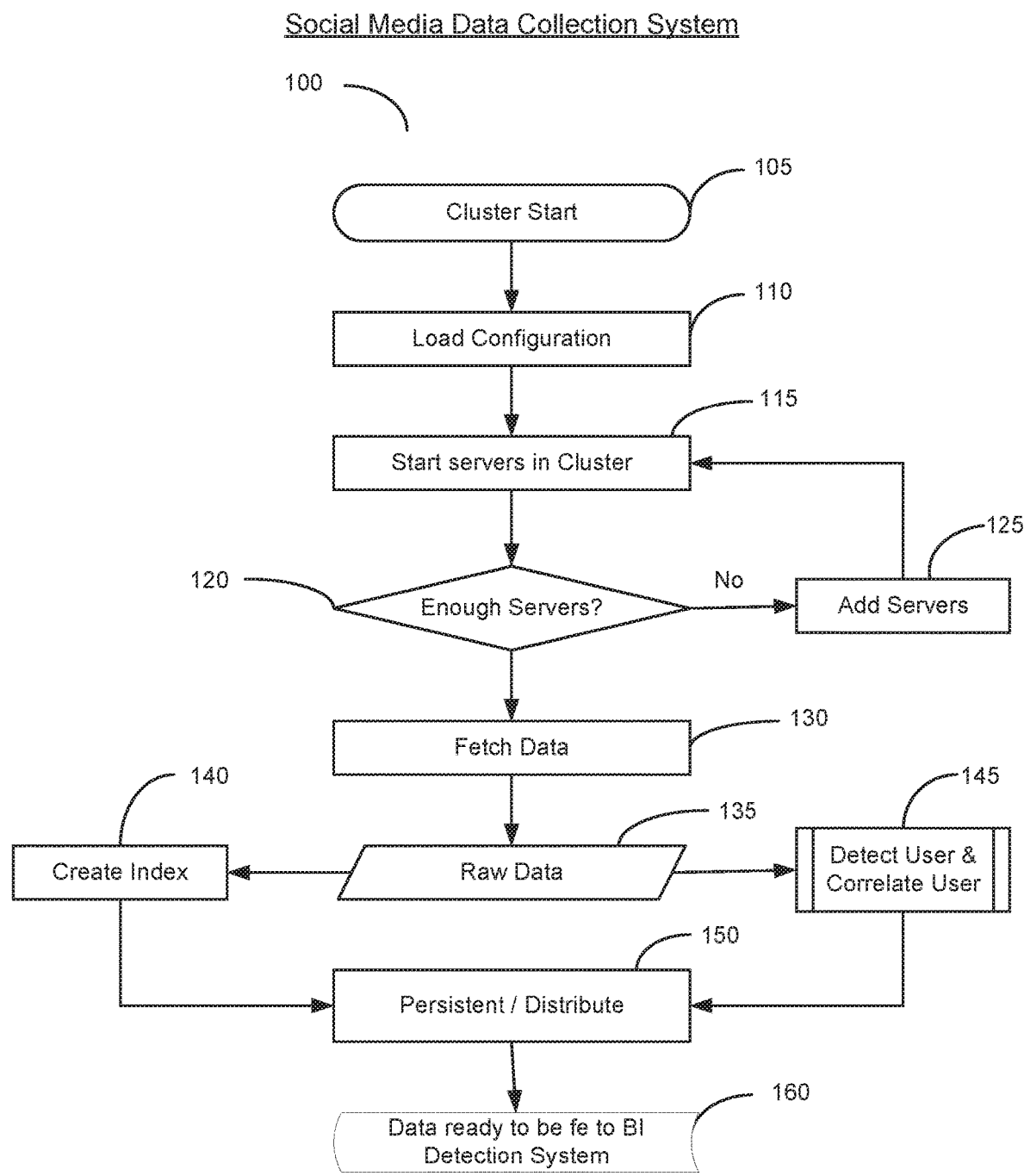
FIG. 1 is a flow chart diagram of a social media data collection method, in accordance with some embodiments of the present invention.

As shown in FIG. 1, a "Social Media Data Collection System" 100 is a server-side system and process which is deployed across many servers. The major functionalities for this system include fetching/collecting data from social media networks, for example, Face Book, Twitter, Renren, Sina Weibo, Wechat, Linkedin and many other blogs and many other web sites. In practice, the number of servers used for data collection is based on the system configuration. If there are more companies, more customer accounts, or more keywords to search on web sites, the system may dynamically deploy more servers. After data is collected, it is persisted and maintained in the database first, and then pushed to a container of a distributed network cache for further processing. The system may include many data process systems, many or all of which may consume data from a specific container in a distributed network cache, and push the analyzed results to another container.

According to some embodiments, methods are provided for substantially automated extracting of buy intent (BI) indications of social media users, using enabling computing devices to process social media data to estimate buy intent; to enable manual grading of real social data for BI estimation training; to enable combining of exact match analysis, vector space modeling, POS tagging and message replacement, and using Bayesian classification algorithms for BI estimation; utilizing BI scores to identify potential buyers; utilizing BI scores to Identify positive and negative influences; utilizing BI scores to estimate advertising efficiency; utilizing BI scores to estimate parameters for targeted fixed effects like gender, age, education, income, region, search history and purchase patterns; utilizing BI score to identify potential buyers common properties; and utilizing BI scores to trace stimulation factors for potential buyer status changes.

As can be seen in FIG. 1, in step 105 a clustering of servers is initiated to handle the organization of available data into manageable and linked groups by Social Media Data Collection System 100.

In step 110 a pre-defined configuration is loaded into the cluster that has been started to enable the clustering and capability establishment of the server cluster to perform the necessary functions for data collection and organization. The configuration also enables the cluster to assess its own capacity to handle the data volume and dynamically set the cluster size In step 115 servers can be started in the cluster, to enable the configured cluster data to be processed and/or served to system and/or system users.

In step 120 a decision is to be taken whether there are enough servers to process and/or serve the users. If not, at step 125 additional server(s) may be added.

If there are enough servers at step 120, data is fetched in step 130, from multiple social media sources, in multiple data formats.

In step 135 raw data is acquired from the collected data, to be further processed.

In step 140 an index is created from the raw data, for enabling rapid categorization, sorting, fileting and searching of social media data.

In step 145 the raw data is processed by an algorithm to detect the specific user(s), and to correlate detected user(s) to the user profiles in the Social Media Data Collection System 100.

In step 150 the indexed and/or user correlation data are further processed to determine whether the collected data is to be persisted/maintained in the system 100, or is to be distributed to system users.

In step 160 the processed persistent and/or distributed data is fed to a further BI processing engine or element, for BI specific analyzing, to detect user Buy Intent.

Figure 2:
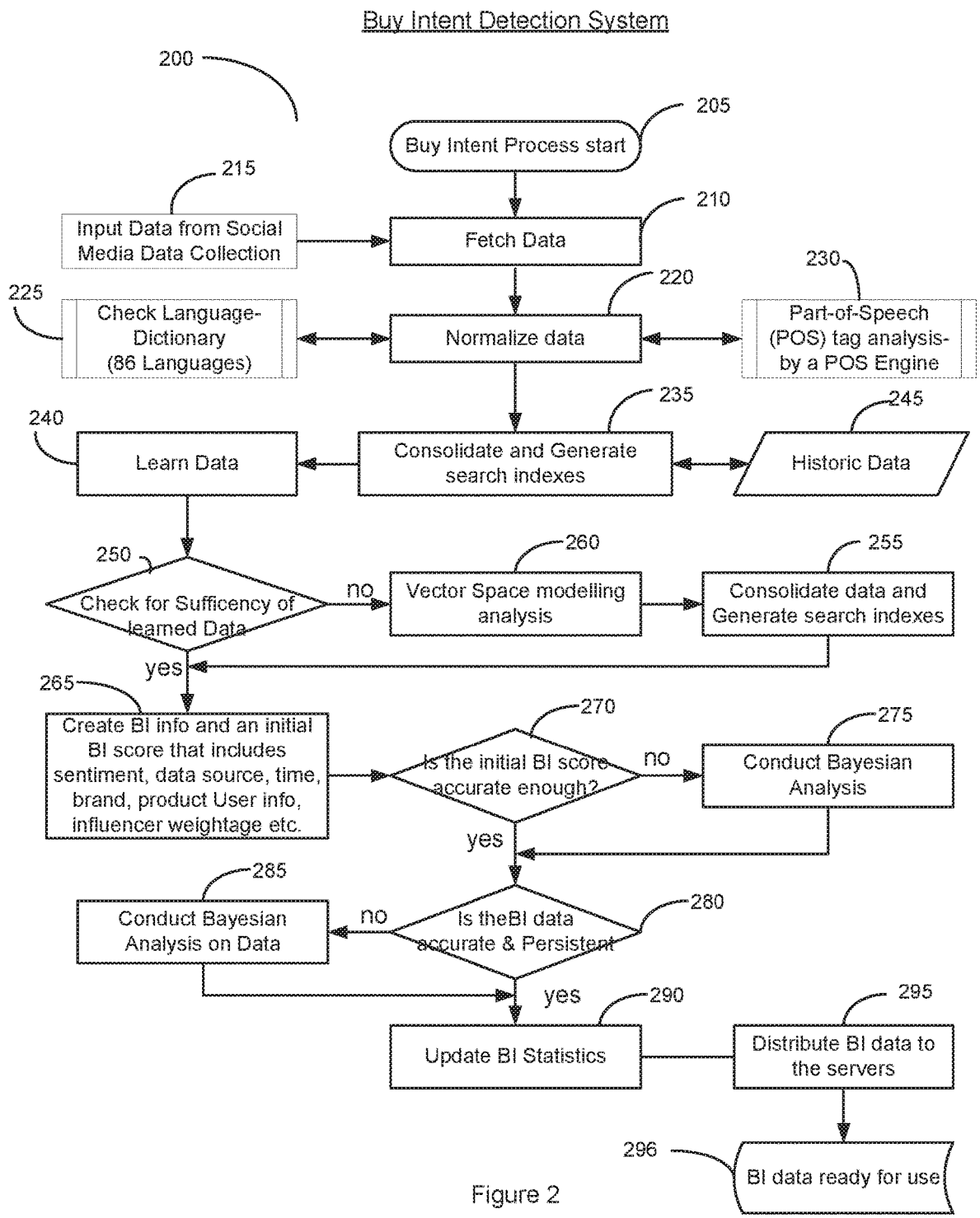
FIG. 2 is a flow chart diagram of a Buy Intent Detection method.

In the embodiment illustrated in FIG. 2, Buy Intention Detection is one of the parts of the Buy Intent analysis process. The system may include many independent processes that all pull messages from one container in a distributed network repository. The flow chart in FIG. 2 describes the major elements and their interaction in the system.

In preferred practice, the collected data is supplied to a computational-capable server having at least a processor and at least a storage capability, to teach the processor to analyze the available data. Once taught, additional data can be provided to the server to generate a rating of the buy intent of the customers. For example, there are many millions of messages collected in the system per hour or even second, and the number is continually growing daily as more customers, accounts and different search criteria and interests are entered. The system's servers may be deployed in a cluster with virtually unlimited computing power. This process is dynamic in that more servers can be added automatically if needed.

As can be seen in FIG. 2, a work flow example of a "Buy Intent Detection System" is described.

In step 205, the BI process is started by the Social Media Data Collection System 100.

In step 210 data is fetched from multiple social media sources, and in step 215, the fetched social media data is collected together in the system data storage facilities.

In step 220 the data is normalized, to convert all received data into a unified format, by system data converter element.

In step 225 the data is processed by a dictionary, optionally with multiple languages, to further normalize data from multiple languages.

In step 230 the data is processed using a POS tag Analysis Engine, to identify critical POS sale data.

In step 235 search indexes are generated, to help rapidly search and sort collected data.

In step 245 data history is used to help generate more accurate search indexes. In step 240 learned data is updated, from the search indexes and/or historical data.

In step 250 the system determines whether sufficient learned data exists to generate accurate search indexes.

If no learned data exists, then in step 260 vector space modeling analysis may be executed, to further process collected data, to complement the accuracy of the learned data. Additionally or alternatively, in step 255 message similarity analysis is executed, to further process collected data, to complement the accuracy of the learned data.

If sufficient learned data exists, then in step 265 BI related data is fetched or created into a file, for example, including data source, time, brand, product, BI score, user information, influence weight, etc.

In step 270 a decision is taken by the system as to whether the BI information acquired is accurate enough.

If not, in step 275, Bayesian analysis is executed on the processed BI data.

Alternatively or additionally, if the data is accurate enough, in step 280, if the data is determined to be persistent, the system BI statistics are updated, to include the latest BI definitions, classifications, etc.

In step 295 the processed BI data as determined by the above steps is distributed to the system's servers, for distributions to system elements or components.

In step 296, the distributed BI data is ready for usage by system users.

Figure 3:
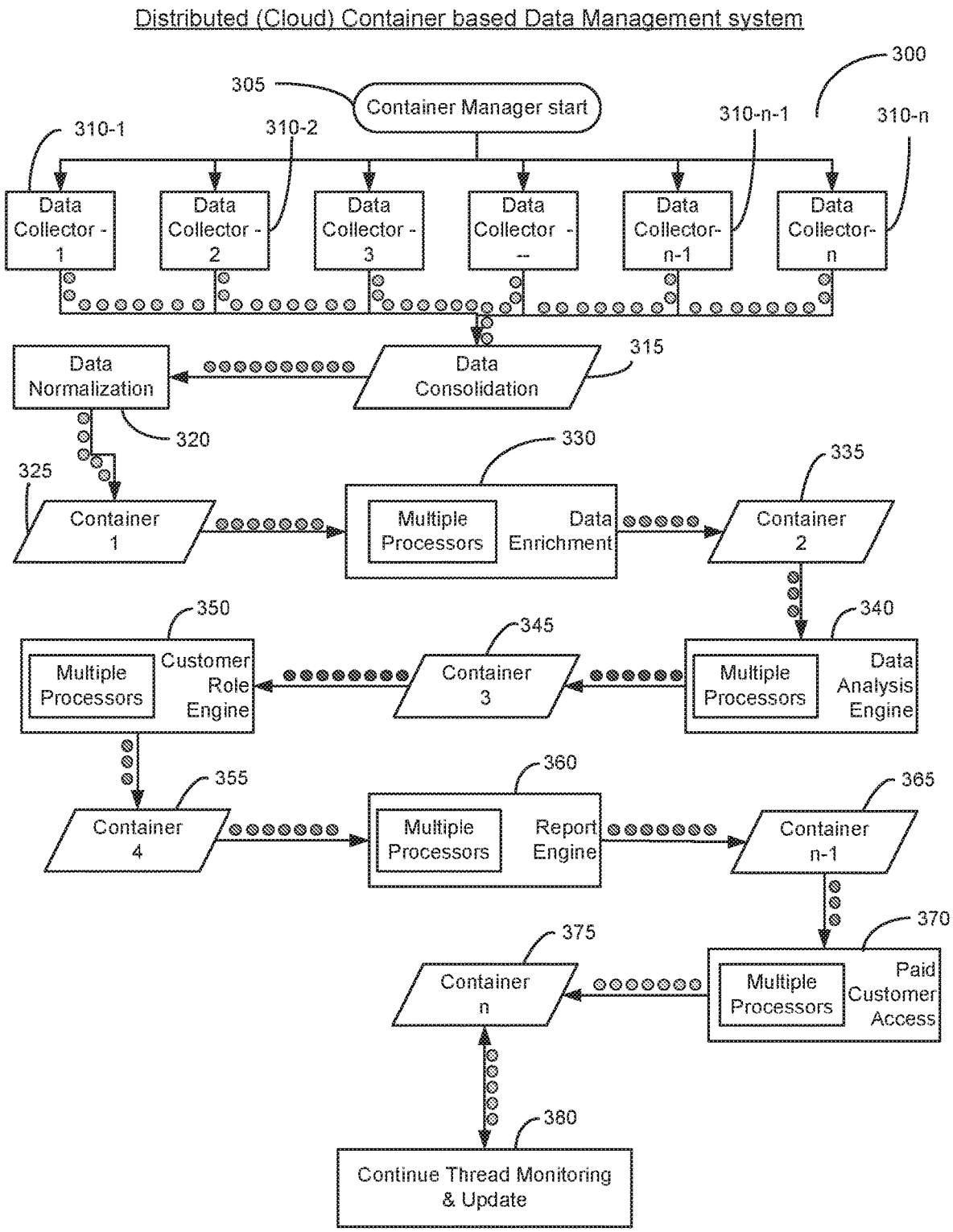
FIG. 3 is part of a flow chart diagram of a Message Processing method.

The flow chart in FIG. 3 illustrates elements in the system's message system, to convey a part of the functionality being described herein. The system may have many servers on a cloud that collect data from social media. The collected data is put into a virtual processor location, referred to hereinafter as a "container" of a network distributed cache. Many processes can concurrently access the same container at any time. Each process can pull one message a time and process it, and may push the modified data into another container. A user can create any number of containers at run time. The system also enables many processes to work similarly, whereby the number processes run in the system is dependent on the system configuration. For example, a user may configure from 1 to hundreds, thousands or more processes at will. Of course, more processes may require more computing power.

FIG. 3 is a 2-part flow chart diagram of a generic Message Processing Method, in accordance with some embodiments. As can be seen, in step 305 the container manager process is started by Social Media Data Collection System 100.

In step 310, the collected social media data is sent to multiple data collectors 1 to n.

In step 315 the data collectors data is consolidated, for example, collected from different sources into system data collectors.

In step 320 the data is normalized, for example, to aggregate different formats and types of data.

As can be seen, in step 325 multiple processors are used to pull BI related data from a container(s) and to further process one or more data elements, and then push the resultant processed data elements to a further data container.

In step 330 data enrichment is executed, optionally including processing the pre-processed data for BI related information such as sentiment, mood, intention, spam etc.

In step 335, container 2 may be further processed by Social Media Data Collection System 100.

In step 340 a data analysis engine processes container data for further BI related metrics, such as influence, topic, trend, popular keys, buy intention, targeting analysis etc.

In step 345 container 3 may be further processed by Social Media Data Collection System 100.

In step 350 a customer role engine dispatches the message to different queues based on system requirements, such as customer rules, conditional processing etc.

In step 355 container 4 may be processed by Social Media Data Collection System 100.

In step 360 a report engine processes the data to generate BI related reports.

In step 365 container x is processed by Social Media Data Collection System 100.

In step 370 a data API for paid customers is run, to manipulate and fetch data for advanced features or functions as may be used by paid users.

In step 375 container n is processed by Social Media Data Collection System 100.

In step 380 thread updates are monitored to determine BI related modifications in data threads.

The system described herein may have many servers on a cloud that collect data from social media. The collected data is put into a container of a network distributed cache. Many processes can concurrently access same container at any time. Each process can pull one message a time and process it, and may push the modified data into another container. A user can create any number of containers at run time. The system also enables many processes to work similarly, whereby the number processes run in the system is dependent on the system configuration. For example, a user may configure from 1 to hundreds, thousands or more processes at will. Of course, more processes may require more computing power.

It should be appreciated that embodiments of the present invention may include a combination of one or more of the following elements:
- Combine user social media data from multiple source (FB, Twitter, Linkedin, Renren, Sina weibo, Tencent wechat etc.) to estimate buy intent.
- Manually grading social data for BI.
- Feeding data into the system for AI and Bayesian learning for BI.
- Estimating BI using a combination of first direct matching, Vector Space analysis, POS tag analysis and message replacement, and then Bayesian statistics.
- Utilizing BI scores to identify potential buyers.
- Utilizing BI scores to Identify positive and negative influencers.
- Utilizing BI scores to estimate advertising efficiency.
- Utilizing BI score to estimate parameters for targeted fixed effects like gender, age, education, income, region, search history and purchase patterns.
- Utilizing BI scores to identify potential buyers' common properties.
- Utilizing BI scores to trace stimulate factors for potential buyer status change.

In one example, each message can be classified into five categories as follows:

TABLE 1

Message buy intent category list

| Category Name | Description | Score |
| --- | --- | --- |
| No buy intent | Message contains no buy intent | 0.00 |
| Weak intent | Message contains weak buy intent | 0.25 |
| Medium intent | Message contains medium buy intent | 0.50 |
| Strong intent | Message contains strong buy intent | 0.75 |
| Bought | Owner already purchased item(s) from brand | 1.00 |

Let $V_{ki}$ be the actual values and $N_{ki}$ be actual occurrence of $V_{ki}$ for individual K. The buy intent for individual k can then be calculated as:

$$N_k = \sum_{i=1}^{5} N_{ki}$$

$$BI_k = \sum_{i=1}^{5} N_{ki} \times V_{ki} / N_k$$

The $BI_k$ and $N_k$ are two independent variables though the $N_k$ has significant effects on $BI_k$ estimation accuracy. We have found that the accuracy of $BI_k$ estimation becomes relatively stable when the number of messages used for each individual exceeds 30. Therefore, the analysis only chooses the individuals who have 30 or more relevant messages to participate in the data analysis, thereby to increase the estimation accuracy. A key technology relates to the classification of each relevant message into specified categories based on learned data.

BI Estimation

The BI estimation process can include sample dataset manual grading, raw data preparation, classification engine dynamic data training, BI calculation and parameters estimation etc.

Dataset manual grading: A significant process is classification engine training. It requires grading a set of messages into categories, for example the five categories described above, and feeding them into classification engine learn module. Although there is no lower limits of number graded messages, the number should exceed ten thousands to satisfy minimum estimation accuracy. Generally speaking, the more graded messages for learning will resulting in more accurate estimation. The estimation accuracy obeys logistic distribution with the following properties:

Probability function:

$$P(x) = \frac{e^{-(x-m)/b}}{b[1 + r^{-(x-m)/b}]^2}$$

Distribution function:

$$D(x) = \frac{1}{1 + e^{-(x-m)/b}}$$

The accuracy improvement becomes less and less significant if number of graded messages reaches more than hundred thousand. The actual regression of actual accuracy improvement and number graded messages for training dependents on actual data and quality of grading.

Raw data preparation: Graded data must be normalized before either fed into classification engine's learn module or used for BI estimation. This process transfers message text to lowercase and eliminates irregular spacing. It first changes word case and adds spaces before and after each punctuation character and then parses whole message into words and punctuation array using space as delimiter. The misspelled words will be replaced based on Bayesian probability. Then three messages will be reconstructed. The first message is constructed by inserting single space between consecutive words and appending punctuation character without using any space. The second message is constructed similarly as first one except original stop words being eliminated from word array. The third message is constructed similarly as first one except all the words in the array are transferred to corresponding root words. For example, the word "sits" and "sat" are transferred to sit, the word "cars" and "happier" are transferred car and happy respectively. Three MD5 hashes are calculated and persistent along with classification category information.

POS tags input for classification engine: In order to detect POS of social media message, huge amount of graded n-gram data has been incorporated into classification engine (CE). These n-grams are generated based on the largest publicly-available, genre-balanced corpus of English—the 450 million word Corpus of Contemporary American English (COCA), 1.8 billion words data from GloWnE and 1.9 billion words from 4.4 million Wikipedia articles. The data is consisted of three pieces of information: 1, 2, 3, 4, 5-word sequences, frequency counts and corresponding individual POS tags for the word sequences. The information stored in CE memory efficiently. Original phrase will be used as identifier If actual phrase char length is smaller than 16. The MD5 hash will be used as identifier otherwise.

TABLE 2

Partial Penn Treebank POS tag list

| Category | Examples | Tags |
|---|---|---|
| Adjective | happy, bad | JJ |
| Adjective, ordinal number | 72nd, last | JJ |
| Adjective, comparative | happier, worse | JJR |
| Adjective, superlative | happiest, worst | JJS |
| Adjective, superlative, semantically | chief, top | JJ |
| Adjective, cardinal number | 3, fifteen | CD |
| Adjective, cardinal number, one | one | CD |
| Adverb | often, particularly | RB |
| Adverb, negative | not, n't | RB |
| Adverb, comparative | faster | RBR |
| Adverb, superlative | fastest | RBS |
| Adverb, particle | up, off, out | RP |
| Adverb, question | when, how, why | WRB |
| Adverb, degree & question | how, however | WRB |
| Adverb, degree | very, so, too | RB |
| Adverb, degree, postposed | enough, indeed | RB |
| Adverb, nominal | here, there | RB |
| Conjunction, coordination | and, or | CC |
| Conjunction, subordinating | although, when | IN |
| Conjunction, complementizer | that | IN |
| Determiner | this, each, another | DT |
| Determiner, pronoun | any, some | DT |
| Determiner, pronoun, plural | these, those | DT |
| Determiner, prequalifier | quite | PDT |
| Determiner, prequantifier | all, half | PDT |
| Determiner, pronoun or double conj. | both | DT(CC) |
| Determiner, pronoun or double conj. | either, neither | DT(CC) |
| Determiner, article | the, a, an | DT |
| Determiner, postdeterminer | many, same | JJ |
| Determiner, possessive | their, your | PRP$ |
| Determiner, possessive, second | mine, yours | PRP |
| Determiner, question | which, whatever | WDT |

TABLE 2-continued

Partial Penn Treebank POS tag list

| Category | Examples | Tags |
|---|---|---|
| Determiner, possessive & question | whose | WP$ |
| Noun | aircraft, data | NN |
| Noun, plural | women, books | NNS |
| Noun, proper, singular | London, Michael | NNP |
| Noun, adverbial | tomorrow, home | NN |
| Noun, adverbial, plural | Sundays, weekdays | NNS |
| Pronoun, nominal | none, everything, one | NN |
| Pronoun, personal, subject | you, we | PRP |
| Pronoun, personal, subject, 3SG | she, he, it | PRP |
| Pronoun, personal, object | you, them, me | PRP |
| Pronoun, reflexive | herself, myself | PRP |
| Pronoun, question, subject/object | who, whoever | WP |
| Pronoun, existential | there | EX |

POS tags selection: The Classification engine adapts Penn Treebank POS tag system. Every word in social media message is associated with POS tag. All possible POS tags are listed in Table 2. The algorithm for POS tag selection is based on probability learned in previous step. The message is normalized and parsed into word and punctuation array. Slide window can have maximum five words sequence and any phrase stops whenever it encounters a punctuation. The original phrase or its MD5 hash (if phrase is longer than 16 bytes) is constructed to retrieve learned POS tag information. The corresponding tags in learned data will be used for current message if match found. Relative heavier weight is given to longer n-gram if there is conflict between different sizes of n-gram. The selection always starts in current word and tries to use longer n-gram. After exhausting sequences and making the POS choice for each word, work window is slide to right and whole process is repeated till all words in message are exhausted.

Princeton WordNet for classification and similarity calculation: The Classification engine introduces Princeton WordNet for classification index computing. WordNet® is a large lexical database of English and it groups nouns, verbs, adjectives and adverbs into 117 000 cognitive synonyms (synsets). Synsets are interlinked by means of conceptual-semantic and lexical relations. CE also incorporates more than 124 thousands manual graded phrases (two or more words) into WordNet and expands grouping to all kinds of POS types. The new generated "Synsets" are utilized intensively to compute similarity index between two messages and detect whether given message is similar to learned data. Similarity index between two messages are calculated using following steps:

Input message normalization
    Input message parsing
    Input message POS selection
    Using new formed POS array to retrieve all corresponding learned messages
    Computing word weight, start from index value 1.0 and determine steps needed to exchange words in current message with words in synsets to make current message similar to learned data. The fewer traverse steps will result in higher match index. The match index will be one if identical message found in learned data set.
    This phenomenon may be expressed more clearly in genetic terminology. One may view each message as chromosome and each word in the message as locus on the chromosome. Number of loci on a chromosome is unlimited. The effects from different loci are additive. Each locus may have two or more alleles which may interact among them and show dominance effect. Multiple alleles correspond multiple words in single synonyms group in synsets.

One may put different weights on different POS types and on steps needed to change each word to match learned data.

$$I = \sum_{i=0}^{n} w_i \prod_{j=0}^{m_{ij}} (1 - v_{ij})$$

Where n is total number words in message, $w_i$ is weight on i'th word based on POS, $m_{ij}$ is the steps needed to transform original word to one learned word in synsets so that new formed message match one of the learned messages. $m_{ij}$ can be 0.0 that means current word does not needs transformation. The product part in above formula will become 1.0 if no step needed for transformation. $V_{ij}$ is the contribution cost for transformation for i'th word at step j.

Vector space model and messages similarity calculation: The vector space model is widely used for related documents retrieval and messages similarity calculation mainly because of its conceptual simplicity and the appeal of the underlying metaphor of using spatial proximity for semantic proximity. Vector space model treats message as a point in an n-dimensional spaces where n is the number of common words in the two messages or message and a category. The coordinators of given message and group are calculated based word frequency occurred in message and group of messages. The similarity coefficient is usually expressed as vectors normalized correlation coefficient as follows:

$$\cos(g, m) = \frac{\sum_{i=1}^{n} g_i m_i}{\sqrt{\sum_{i=1}^{n} g_i^2} \sqrt{\sum_{i=1}^{n} m_i^2}}$$

Where $g_i$ is i'th word frequency for one of learned categories and $m_i$ is the i'th word frequency for current message. The advantage of vector space model is that it uses little computer memory and computing algorithm is simple and direct. The disadvantage is that it does not use other information like word order, word combinations, word meaning and AI technology etc.

Bayesian classification and Bi estimation: When conducting Bayesian classification, BI classification information is derived from graded data and current message. To estimate the probability of a current message belonging to a certain BI category, the following can be used:

$$P(C_i | W) = \frac{P(W | C_i)}{P(W)}$$

Where $C_i$ represents different BI subclass. Since only relative values are of interest, P(W) can be ignored.

$$\frac{P(C_i | W)}{P(C_j | W)} = \frac{P(W | C_i)}{P(W | C_j)} = \frac{P(W_1 \cap W_2 \cap ... \cap W_n | C_i)}{P(W_1 \cap W_2 \cap ... \cap W_n | C_j)}$$

From the Chain rule, we have $$P(W_1 \cap W_2 \cap ... \cap W_n) = P(W_1)P(W_2 | W_1)P(W_3 | W_1 \cap W_2) ... P\left(W_n \bigcap_{i=1}^{n-1} W_i\right)$$

We use simplest phrases weight and calculate each phrase probability as follows $$2^{m-1} \sum_{i=1}^{n-m} P(W_i \cap W_{i+1} \cap W_{i+2} ... \cap_{i+m}) = \sum_{i=1}^{n-m} C_{w_i w_{i+1} ... w_m} / S_m$$

Bi classification is determined based on calculated probability of current message association with each BI category.

BI Estimation

After Graded BI category data has been fed into a CE learning module, message are normalized and parsed into word and punctuation array. The POS tags are selected based on the probability model described above. Exact message information, different length word phrases are constructed and occurrence frequencies are accumulated and recorded. Vector space model and Bayesian basic statistics also established. At run time, BI value for each message is calculated as follows:

Input message normalization

Input message parsing

Incorrect words replacement

Exact match detection. This process basically detects whether we have exact message learned. If found, the corresponding BI category will be returned.

Vector space modeling to detect smallest deviation from any category. This is done with given threshold accuracy value. Only higher accuracy (close 1.0) be chosen as return value.

POS type and associated words are used to detect whether we have similar messages learned in each category. This process demands higher computing resources. Many messages are retrieved from repository based on words within current message and transverse to detect whether current message can be made similar with any of learned messages.

Finally Bayesian analysis is conducted to choose the BI category based highest association probability. This is catch all process and it always yields classification result.

BI Applications

After calculating the BI score for each social media message, each message can be used as an independent variable and fitted into general mixed model equations to estimate the best linear unbiased estimators for many major factors, like author age, gender, region, income, education etc. The correlation coefficients between sentiment score and BI score can be estimated. The BLUE of advertisement efficiency can be computed by introducing targeted criteria and other fixed independent variables into model. By calculating weighted average of BI score for individual user, we can further identify potential buyers at early stage and offer guideline for company production and other activity planning. Since every user in social media network is inter-linked, BI can also be used to identify the most positive and negative influencers to a given brand. User's BI score can also be used as selection filter to generate subset of social messages which then be fed into further topic analysis model to determine common properties among potential buyers. Also, filtered data is used identify the real relationship among potential buyers and trace circumstances that stimulate user status change. Following is the basic mixed model formula for the best linear unbiased estimation (BLUE).

$$Y = X'\beta + Z'\mu + e$$

Where:
Y is observation dependent matrix with n rows and m columns containing BI as one column
X is relation matrix (n×p) that links fixed β to observations
β is fixed parameter vector with dimension p×1
Z is relation matrix(n×q) that link random μ to observations
μ is random parameter vector with dimension q×1
e is random error effect with dimension n×1
E(e)=0
var(e)=R, n×n systematic error variance matrix
var(μ)=G, q×q systematic variance-covariance matrix
con(μ, e')=0
Mixed model equations then can be written as:

$$\begin{pmatrix} X'R^{-1}X & X'R^{-1}Z \\ Z'R^{-1}X & Z'R^{-1}Z+G^{-1} \end{pmatrix} \begin{pmatrix} \beta \\ \mu \end{pmatrix} = \begin{pmatrix} X'R^{-1}Y \\ Z'R^{-1}Y \end{pmatrix}$$

Solution to generic model above is then:

$$\begin{pmatrix} \beta \\ \mu \end{pmatrix} = \begin{pmatrix} X'R^{-1}X & X'R^{-1}Z \\ Z'R^{-1}X & Z'R^{-1}Z+G^{-1} \end{pmatrix}^{-1} \bullet \begin{pmatrix} X'R^{-1}Y \\ Z'R^{-1}Y \end{pmatrix}$$

At this juncture, it should be clear that, in other embodiments, methods are provided for enabling computing devices to use social media data to estimate to enable manual grading of real social data for BI estimation training; to enable combining of exact match analysis, vector space modeling, POS tagging and message replacement, and Bayesian classification algorithms for BI estimation; utilizing BI scores to identify potential buyers; utilizing BI scores to Identify positive and negative influences; utilizing BI scores to estimate advertising efficiency; utilizing BI scores to estimate parameters for targeted fixed effects like gender, age, education, income, region, search history and purchase patterns; utilizing BI score to identify potential buyers common properties; and utilizing BI scores to trace stimulation factors for potential buyer status changes.

Further at this juncture, it should be clear that the capability of the system to provide automated identification, analysis and use of available social media data can enable companies to enhance revenue generation and business decision making.

As mentioned above, the system may be enabled by data processing algorithms that integrate Vector space models and Bayesian basic statistics. Although the underlying mathematics theory being used herein is partially similar in Vector space and Bayesian statistics analysis, the way in which the system utilize and apply these theories are unique, particularly in terms of the parameters derivation, actual data manipulation and iteration criteria. The system described herein incorporates AI and generic algorithms into existing vector space and Bayesian analysis, thereby changing both the process and the results.

According to some embodiments, the buy intention analysis is substantially executed using a computer code (for example, a computer program which is written using C#) running on a server (for example, window server 2008) a connected to a data cloud (for example, Amazon servers cloud). There can be multiple physical servers running on the cloud on a cluster system behind a load balancer. The load balancer is configured to receive huge numbers (example, Millions per second) of social media data items that are downloaded every minute, and to distribute the data to one of the servers in the cluster system. The BI system on the server analyzes the data and derives a buy intent value between 0.0 and 1.0. The higher the number means the stronger the buy intent, wherein the maximum value is 1.0.

In summary, the following aspects are noteworthy:
  The system collects social media information from multiple social media channels like Face book, twitter, Linkedin, Renren, Tecent, Sina Weibo etc.
  The system manually grades partial data initially for BI, and feeds the data into AI and Bayesian learning systems.
  The system uses artificial intelligence to link multiple messages published on multiple social media sites to the same user.
  The system correlates, executes regression, indexes and persists or maintains all this data for fast retrieval.
  The BI system is trained using AI and statistical methods uniquely for BI.
  The system uses several innovative mechanisms to estimate BI (see details later). Both the concept and methodology for doing so are designed and configured specifically for social media data.
  The system runs algorithms to use BI dynamically in advertisements.

Further, embodiments of the BI system described herein may be used to calculate a numeric value (between 0.0 to 1.0), to represent whether the user is likely to buy one or more products from a brand.

Organizations may use this data to implement, for example:
  Business activity planning
  Material purchasing
  Target advertisement and increasing sales
  Product improvement
  Customer relation management
  Companies can use this data as an independent variable to identify whether age, gender, incoming, region, ethic group and other social groups has a preference for their product
  Risk management Exemplary embodiments have been described with reference to specific configurations. The foregoing description of specific embodiments and examples has been presented for the purpose of illustration and description only, and although the invention has been illustrated by certain of the preceding examples, it is not to be construed as being limited thereby.

What is claimed is:

1. A method implemented on a processing device, the method using information embedded in social media data messages to identify potential buyers and determine the potential buyers' buy intent (BI) in terms of BI scores and thereby provide companies with market information to influence buying decisions of individuals, improve advertisement efficiency, reduce potential risk and grow sales and revenue, the method comprising:
  establishing a social media data messages collection system, wherein the social media data messages collection system comprises a plurality of servers and storage containers located in a cloud, wherein the plurality of servers is configured with processing capability, wherein a number of servers within the plurality of servers is dynamically adjustable based on social media data messages collected and processed in the social media data messages collection system;

wherein the social media data messages are based on a number of companies, brands, customers that are catered to, and a number of key-words used;

fetching and collecting, by the social media data messages collection system, social media data messages from social media network sites and websites;

saving the collected social media data messages in the storage containers located in the cloud;

normalizing the social media data messages collected in the storage containers by a data convertor element located within the plurality of servers, wherein normalizing the collected social media data messages comprises:

processing the social media data messages by a multi-language dictionary located within the plurality of servers, wherein the multi-language dictionary comprises multiple languages to convert social media data messages from foreign languages;

converting the social media data messages processed by the multi-language dictionary using a data converter element within the plurality of servers, wherein the data converter element is configured to convert the social media data messages collected in the storage containers into a unified standard word format; and processing and tagging the social media data messages converted by the data converter element using a part of speech (POS) tag analysis engine, wherein the POS tag analysis engine is configured to generate accurate search indexes for improved search and collection of relevant social media data messages;

training the social media data collection and processing system using the collected social media data messages for artificial intelligence (AI) based BI estimation, wherein the training comprises supplying the collected social media data messages to a first server within the plurality of servers, wherein the first server comprises at least one processor configured to analyze the social media data messages to generate a BI estimation; and providing the normalized and POS tagged social media data messages to the at least one processor of the first server to generate BI estimation in the form of BI scores, wherein generating BI scores comprises:

processing the normalized and POS tagged social media data messages using vector space modelling, exact match analysis, message replacement and Bayesian classification algorithms to determine a first group of social media data messages to generate the BI score estimation for a potential buyer, wherein the first group of social media data messages comprises a number of social media data messages relating to a brand, a product or a service associated with the potential buyer that exceeds a minimum threshold value, wherein the number of social media data messages that exceeds a minimum threshold value are associated with the potential buyer, and wherein the BI score estimation of the potential buyer is converted into a BI score using the at least one processor.

2. The method of claim 1, further comprising utilizing the BI score to identify potential buyers of goods and services.

3. The method of claim 1, further comprising utilizing the BI score to identify positive and negative influencers of potential buyers.

4. The method of claim 1, further comprising utilizing the BI score to estimate advertising efficiency.

5. The method of claim 1, further comprising utilizing the BI score to estimate parameters for targeted advertising using fixed effects like gender, age, education, income, region, search history and purchase patterns.

6. The method of claim 1, further comprising utilizing the BI score to identify parameters that impact a potential buyer's purchase decision.

7. The method of claim 1, further comprising utilizing the BI score to trace factors for potential buyer status changes.

8. The method of claim 1, wherein a BI score for an individual k is calculated from $N_k$ social media data messages as:

$$N_k = \sum_{i=1}^{5} N_{ki}$$

$$BI_k = \sum_{i=1}^{5} N_{ki} \times V_{ki} / N_k$$

wherein the $BI_k$ and $N_k$ are two independent variables, where $BI_k$ is a BI score of a 'K'th individual, $V_{ki}$ is a value of the individual messages in an ith learned category, $N_k$ a number of social media data messages used to calculate the BI score of the 'K'th individual and 'i' is an 'i'th learned category of messages categorized in the form of the group of learned categories for calculating $BI_k$.

9. The method of claim 8, wherein $N_K$ has the preset value that exceeds 30, and i the number of the group of learned categories equals 5.

10. A system for determining buy intent (BI) in terms of BI Scores by using social media data messages, the system comprising:

a plurality of distributed data collection modules configured to collect the social media data messages in a plurality of languages from web based social media sites;

a multi-language dictionary server configured to translate the social media data messages in the plurality of languages;

a part of speech (POS) tag analysis engine configured to POS tag the social media data messages and establish a minimum threshold value of social media data messages using vector space modelling, exact match analysis, message replacement and Bayesian classification algorithms to determine a first group of social media data messages to generate a BI score estimation for a potential buyer;

a classification engine configured to classify the first group of social media data messages into BI categories and classify each BI category into a word index, thereby grouping the first group of social media data messages into a learned set of categories; and at least one cloud-based distributed processor dynamically configured to construct a vector space model based upon the learned set of categories, to generate a BI score there from, wherein constructing the vector space model comprises:

converting common words in a graded set of social media data messages into the learned set of categories, and determining a similarity coefficient based on word frequency.

11. The system of claim 10, wherein the similarity coefficient is expressed as:

$$\cos(g, m) = \frac{\sum_{i=1}^{n} g_i m_i}{\sqrt{\sum_{i=1}^{n} g_i^2} \sqrt{\sum_{i=1}^{n} m_i^2}}$$

wherein $g_i$ is i'th word frequency for one of the learned set of categories and $m_i$ is the i'th word frequency for current message.

12. The system of claim 10, wherein the BI score for an individual k is calculated by the at least one cloud-based distributed processor as:

$$N_k = \sum_{i=1}^{5} N_{ki}$$

$$BI_k = \sum_{i=1}^{5} N_{ki} \times V_{ki} / N_k$$

wherein the $BI_k$ and $N_k$ are two independent variables, $BI_k$ is a BI score of a 'K'th individual, $V_{ki}$ is a value of individual's messages in an 'i'th learned category, $N_k$ is a number of social media data messages used to calculate the BI score of the 'K'th individual and 'i' is an 'i'th learned category of the social media data messages categorized in the form of the learned set of categories, for calculating $BI_k$.

13. The system of claim 12, wherein the BI score for the individual k is calculated as a numeric value to represent whether a user is likely to buy one or more products from a brand.

14. The system of claim 9, wherein the BI score for the individual k is calculated as a numeric value, between 0.0 to 1.0, expressed as a set of five learned categories representing the BI score of the individual.

15. A method implemented on a processing device, the method using social media data from multiple online sources to estimate buy intent (BI) in terms of BI scores, using cloud-based processing, the method comprising:
 collecting social media data located in the multiple online sources using a plurality of data collectors, wherein the multiple online sources are located in a cloud-based storage;
 consolidating the collected social media data in containers in the cloud-based storage;
 normalizing the consolidated social media data to identify key phrases, using POS tag analysis and language dictionaries to process variations in usage and different languages used using the cloud-based processing;
 identifying and generating accurate search indexes using POS tagging combined with available historic data and the identified key phrases, wherein the generated search indexes comprises graded real social data for categorizing the social media data into learned set of categories for BI assessment and AI learning; and
 using the generated search indexes with exact match analysis, vector space modelling, message replacement and Bayesian classification algorithms to generate a BI score for each individual from the learned set of categories;
 wherein the BI score is based on: sentiment, data source information, time, brand, product user info, and influencer weightage;
 wherein the BI score for an individual k is calculated as:

$$N_k = \sum_{i=1}^{5} N_{ki}$$

$$BI_k = \sum_{i=1}^{5} N_{ki} \times V_{ki} / N_k$$

wherein the $BI_k$ and $N_k$ are two independent variables and the a number of messages used for each individual exceeds a pre-set minimum number of data records, where $BI_k$ is the BI score of a 'K'th individual, $V_{ki}$ is a value of the individual messages in an ith learned category, $N_k$ a number of social media data messages used to calculate the BI score of the 'K'th individual and 'i' is an 'i' th learned category of the social media data messages categorized in the form of the learned set of categories for calculating $BI_k$.

16. The method of claim 10, wherein the cloud-based storage is located in distributed containers in the cloud.

17. The method of claim 10, further comprising utilizing the BI scores to identify positive and negative influencers, estimate advertising efficiency, estimate parameters for targeted advertising using fixed effects like gender, age, education, income, region, search history and purchase patterns, identify potential buyer's common properties and find factors impacting for potential buyer status change.

18. The method of claim 10, further comprising utilizing the BI scores to estimate advertising efficiency.

19. The method of claim 10, further comprising utilizing the BI score to estimate parameters for targeted advertising using fixed effects like gender, age, education, income, region, search history and purchase patterns.

20. The method of claim 10, further comprising utilizing the BI score to identify potential buyer's common properties.

21. The method of claim 10, further comprising utilizing the BI score to trace stimulate-factors for potential buyer status changes.

22. The method of claim 10, wherein the BI score for an individual k is estimated as a numeric value (between 0.0 to 1.0) representing a user's likelihood of buying one or more products or services from a brand.

* * * * *